United States Patent Office 3,124,585
Patented Mar. 10, 1964

3,124,585
1-(2-PYRIDYL) 1-PHENYL-2-ARYL PROPENES
Joseph H. Burckhalter, Ann Arbor, Mich., assignor to Parke, Davis & Company, Detroit, Mich., a corporation of Michigan
No Drawing. Filed June 19, 1961, Ser. No. 117,803
5 Claims. (Cl. 260—290)

The present invention relates to 1-(2-pyridyl)-1-propene compounds and to methods for their production. In particular, the invention is concerned with novel 1-(2-pyridyl)-1-propene compounds which in free base form have the formula

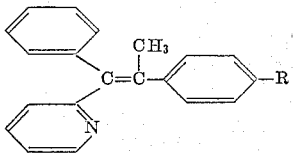

where R can represent hydrogen, the mercapto radical, a lower alkylthio radical or a lower alkoxy radical. The lower alkyl groups constituting part of the radical R are those containing no more than four carbon atoms such as methyl, ethyl, propyl, butyl and branched-chain isomers thereof.

The compounds of the invention can be produced by reacting a 1-(2-pyridyl)-propan-2-ol compound having in free base form the formula

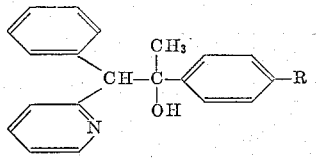

where R is as defined before, with a strong acid whereby dehydration occurs and the desired olefin derivative is obtained. The acid used in the process can be either a strong inorganic acid or a strong organic acid. Examples of suitable acids include mineral acids such as sulfuric, phosphoric, hydrohalic (hydrochloric, hydrobromic and hydriodic) acids, strong organic acids such as benzenesulfonic and p-toluenesulfonic acids, and mixtures of the foregoing. The acid used for dehydration can be either dilute or concentrated and at least one equivalent and preferably a comparatively large excess is used. The process is usually carried out at a temperature between room temperature and 120° C. It is preferable to heat the reaction mixture in order to shorten the time required for completion of the reaction. The process can be carried out using an excess of the acid as a solvent, or in the presence of an additional unreactive solvent such as acetic acid or propionic acid. The product is isolated directly as an acid-addition salt or, following neutralization, as the free base.

The 1-(2-pyridyl)-1-propene compounds of the invention are produced in stereoisomeric forms which are geometric or cis-trans isomers. Where the individual isomers are desired, they are separated by fractional crystallization. The 1-(2-pyridyl)-propan-2-ol compounds employed as starting materials exist in separate diastereoisomeric or dl forms and in general both geometric 1-(2-pyridyl) - 1 - propene isomers are formed form either 1-(2-pyridyl)-propan-2-ol isomer, although in different proportions.

The 1-(2-pyridyl)-propan-2-ol compounds employed as starting materials can be prepared by the reaction of an aryl methyl ketone of the formula

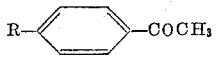

where R is as defined before, with an alkali metal derivative of 2-benzylpyridine under anhydrous conditions followed by hydrolysis of the resulting reaction product. Some of the 1-(2-pyridyl)-propan-2-ol compounds are specifically described in the copending application Serial No. 94,718, filed March 10, 1961.

The 1-(2-pyridyl)-1-propene compounds of the invention can be used either as free bases or in the form of acid-addition salts. Non-toxic acid-addition salts are formed by reaction of the free bases with a variety of inorganic and organic acids such as hydrochloric, hydrobromic, hydriodic, sulfuric, acetic, citric, maleic, malic and p-toluenesulfonic acids.

The products of the invention have useful pharmacological properties and are of value as chemical intermediates in the production of other triaryl-substituted propane derivatives. They are hypocholesteremic and estrogenic agents. They are orally active and, following administration, produce a marked fall in the level of blood cholesterol.

The invention is illustrated by the following examples.

Example 1

A mixture of 6.7 g. of 1-(2-pyridyl)-1-phenyl-2-(4-methylthiophenyl)-propan-2-ol (high melting diastereoisomer, M.P. about 145–147° C.), 40 ml. of glacial acetic acid, 10 ml. of concentrated hydrochloric acid and 25 ml. of 57% hydriodic acid is heated under reflux for two minutes and then poured into a cold solution of 12 g. of sodium sulfite in 200 ml. of water. The mixture is made basic with 40% sodium hydroxide solution and extracted with chloroform. The chloroform extract is dried over anhydrous magnesium sulfate and evaporated in vacuo to give a residue of 1-(2-pyridyl)-1-phenyl-2-(4-methylthiophenyl)-1-propene; stereoisomeric forms M.P. 75–77° C. and 103–105° C. after fractional crystallization from ethyl acetate-petroleum ether. The same two stereoisomers are obtained by the substitution of the lower melting isomer of 1-(2-pyridyl)-1-phenyl-2-(4-methylthiophenyl)-propan-2-ol in the above procedure.

Example 2

A solution of 3.2 g. of 1-(2-pyridyl)-1-phenyl-2-(4-methoxyphenyl)-propan-2-ol (high melting diastereoisomer, M.P. about 154–156° C.) in 10 ml. of 85% phosphoric acid is heated on the steam bath for three hours. The solution is cooled, diluted with water, neutralized with 10% ammonium hydroxide solution and extracted with several 50 ml. portions of ether. The combined ether extract is dried over anhydrous magnesium sulfate, filtered and evaporated to give a residue of 1-(2-pyridyl)-1-phenyl-2-(4-methoxyphenyl)-1-propene. The hydrochloride is obtained by treating an ether solution of the free base with hydrogen chloride; M.P. 165–167° C. after purification by crystallizations from ethanol-ether. The hydrobromide is obtained by treating an ether solution of the free base with hydrogen bromide.

Example 3

A mixture of 8.0 g. of 1-(2-pyridyl)-1-phenyl-2-(4-dimethylsulfamoylphenyl)-propan-2-ol, 40 ml. of glacial acetic acid, 10 ml. of concentrated hydrochloric acid and 30 ml. of 57% hydriodic acid is heated under reflux. During the course of the reaction, the dimethylsulfamoyl group is reduced to the mercapto group and 1-(2-pyridyl)-1-phenyl-2-(4-mercaptophenyl)-propan-2-ol is formed. It is not necessary to isolate the latter product as the desired dehydration occurs in the same reaction mixture. Heating under reflux is continued for 4 hours and the mixture is then cooled and poured into 200 ml. of ice water containing 14 g. of sodium sulfite. The mixture is made basic with 40% sodium hydroxide solution and extracted with several portions of warm chloroform. The combined chloroform extract is dried over magnesium sulfate, filtered and evaporated in vacuo to give a residue of 1-(2-pyridyl)-1 - phenyl - 2-(4-mercaptophenyl)-1 - propene; M.P. 130–132° C. after crystallization from methanol.

The starting material can be obtained as follows. A stirred solution of phenyllithium prepared from 2.1 g. of lithium and 23 g. of bromobenzene in 150 ml. of ether is treated by the addition of 22 g. of 2-benzylpyridine added at a rate sufficient to maintain refluxing. The mixture is stirred under reflux for an additional 30 minutes and then 17 g. of p-dimethylsulfamoylacetophenone in 120 ml. of tetrahydrofuran is added. The mixture is stirred under reflux another 2 hours and then decomposed by stirring it with ice water. The insoluble solid product which separates is collected on a filter. An additional quantity of the same product is obtained by separating the ether phase from the filtrate, drying it over magnesium sulfate, evaporating in vacuo and triturating the semi-solid residue with cold methanol. This product is 1-(2-pyridyl)-1 - phenyl - 2-(4-dimethylsulfamoylphenyl)-propan-2-ol; M.P. 166–168° C. after crystallization from methanol.

*Example 4*

A mixture of 100 g. of 1-(2-pyridyl)-1,2-diphenyl-propan-2-ol (predominantly the isomer melting at about 133–135° C.) and 250 ml. of 85% phosphoric acid is warmed gently to obtain a solution, allowed to stand overnight at room temperature and then heated on the steam bath for 3 hours. The solution is cooled, diluted with ice water and washed with ether. The ether solution is discarded. The aqueous solution is stirred with ether and made basic with ammonium hydroxide solution. The ether phase is separated, combined with an ether extract of the aqueous phase, dried over magnesium sulfate and concentrated in vacuo to an oily residue. The residue is crystallized from hexane and then recrystallized twice from petroleum ether; 1-(2-pyridyl)-1,2-diphenyl-1-propene, mixture of stereoisomers, M.P. 48–54° C. A citrate salt is obtained by adding a methanol solution of citric acid to a solution of the free base in isopropyl alcohol and concentrating to a small volume.

The starting material can be obtained as follows. A stirred solution of phenyllithium prepared from 2.5 g. of lithium and 26 g. of bromobenzene in 250 ml. of ether is treated by the addition of 28 g. of 2-benzylpyridine in 100 ml. of ether added over a five minute period. The reaction mixture is maintained under reflux during the addition, and stirring and heating under reflux are continued for 1 more hour. A solution of 18 g. of acetophenone in 100 ml. of ether is then added and stirring is continued for 2 more hours at room temperature. The mixture is stirred with 300 ml. of water and the ether and aqueous phases are separated. The ether phase is combined with two ether extracts of the aqueous phase and the combined ether solution is washed twice with water, dried over magnesium sulfate, filtered and evaporated to a small volume. The crystalline product which separates is collected and recrystallized twice from 95% ethanol and then from ethyl acetate; 1-(2-pyridyl)-1,2-diphenylpropan-2-ol; M.P. about 133–135° C. The lower melting diastereoisomer, M.P. 107–108° C., is obtained by carrying out fractional crystallizations on the crystallization liquor. Either diastereoisomer or a mixture of the two can be used for dehydration in the foregoing procedure.

I claim:

1. A member of the class consisting of bases and their non-toxic acid-addition salts, said bases having the formula

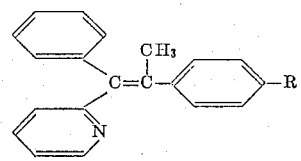

where R is a member of the class consisting of hydrogen, mercapto, lower alkylthio, and lower alkoxy.

2. 1-(2-pyridyl)-1,2-diphenyl-1-propene.

3. 1-(2-pyridyl)-1-phenyl - 2 - (4-mercaptophenyl)-1-propene.

4. 1-(2-pyridyl)-1-phenyl - 2 - (4-methylthiophenyl)-1-propene.

5. 1-(2-pyridyl)-1-phenyl - 2 - (4-methoxyphenyl)-1-propene.

References Cited in the file of this patent

UNITED STATES PATENTS 2,923,710    Bencze et al.             Feb. 2, 1960

FOREIGN PATENTS 61,159      Netherlands            June 15, 1948
84,175      Netherlands            Feb. 15, 1957
208,313    Australia               May 24, 1957